(12) United States Patent
Raghavan et al.

(10) Patent No.: US 11,737,066 B2
(45) Date of Patent: Aug. 22, 2023

(54) DEFAULT BEAM OPERATION OVER A BANDWIDTH PART AS A FUNCTION OF A DEFAULT BANDWIDTH CONFIGURED FOR A USER EQUIPMENT

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 17/302,736

(22) Filed: May 11, 2021

(65) Prior Publication Data

US 2021/0400669 A1    Dec. 23, 2021

Related U.S. Application Data

(60) Provisional application No. 63/042,178, filed on Jun. 22, 2020.

(51) Int. Cl.
*H04W 72/0453*    (2023.01)
*H04L 5/00*    (2006.01)

(52) U.S. Cl.
CPC ....... *H04W 72/0453* (2013.01); *H04L 5/0048* (2013.01); *H04L 5/0053* (2013.01)

(58) Field of Classification Search
CPC . H04L 5/0053; H04L 5/0048; H04W 72/0453
USPC ........................................................ 370/329
See application file for complete search history.

(56) References Cited

U.S. PATENT DOCUMENTS

2013/0148592 A1* 6/2013 Noh ...................... H04W 72/12
                                                                370/329
2020/0221348 A1   7/2020 Lim et al.

FOREIGN PATENT DOCUMENTS

KR    20190011634 A    2/2019
WO    WO-2019195528 A1    10/2019

OTHER PUBLICATIONS

International Search Report and Written Opinion—PCT/US2021/070542—ISA/EPO—dated Aug. 5, 2021.
Nokia, et al., "Summary of QCL", 3GPP Draft, R1-1721429, 3GPP TSG RAN WG1 Meeting #91, 3rd Generation Partnership Project (3GPP), Mobile Competence Centre, 650, Route Des Lucioles, F-06921 Sophia-Antipolis Cedex, France, vol. RAN WG1. no. Reno. Nevada, USA, Dec. 27, 2017-Dec. 1, 2017, Nov. 28, 2017 (Nov. 28, 2017), XP051363881, 21 Pages, Retrieved from the Internet: URL:http://www.3gpp.org/ftp/Meetings%5F3GPP%5FSYNC/RAN1/Docs/ [retrieved on Nov. 28, 2017] p. 4, section 3.

* cited by examiner

*Primary Examiner* — Angel T Brockman
(74) *Attorney, Agent, or Firm* — Qualcomm IP Dept.; James Hunt Yancey, Jr.

(57) ABSTRACT

Various aspects of the present disclosure generally relate to wireless communication. In some aspects, a user equipment may receive, from a base station, a frequency configuration that indicates at least one default bandwidth associated with a configured bandwidth part (BWP); and communicate with the base station using at least one default beam associated with the at least one default bandwidth of the configured BWP. Numerous other aspects are provided.

26 Claims, 5 Drawing Sheets

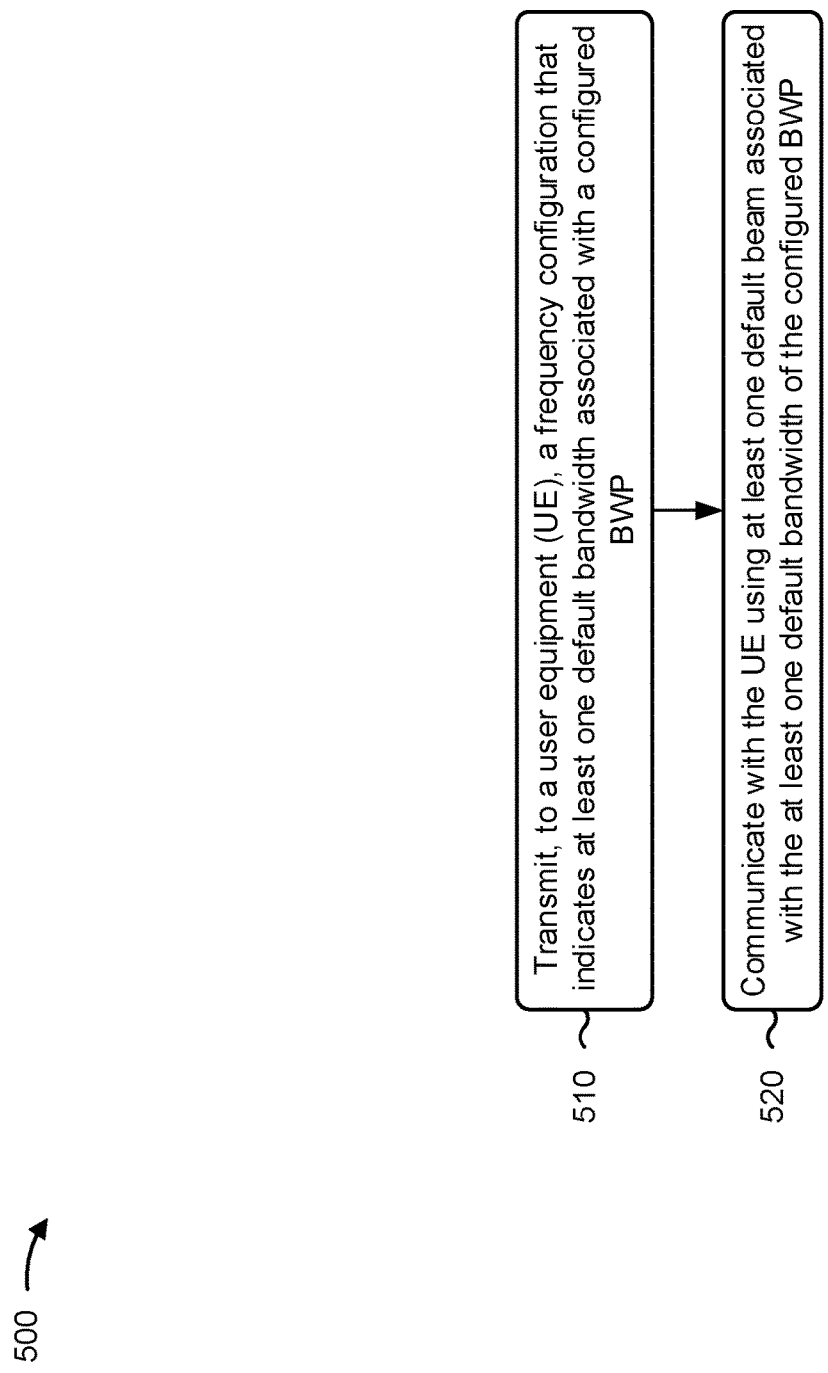

DEFAULT BEAM OPERATION OVER A BANDWIDTH PART AS A FUNCTION OF A DEFAULT BANDWIDTH CONFIGURED FOR A USER EQUIPMENT

CROSS-REFERENCE TO RELATED APPLICATION

This Patent Application claims priority to U.S. Provisional Patent Application No. 63/042,178, filed on Jun. 22, 2020, entitled "DEFAULT BEAM OPERATION OVER A BANDWIDTH PART AS A FUNCTION OF A DEFAULT BANDWIDTH CONFIGURED FOR A USER EQUIPMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for default beam operation over a bandwidth part as a function of a default bandwidth configured for a user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, a frequency configuration that indicates at least one default bandwidth associated with a configured bandwidth part (BWP); and communicating with the base station using at least one default beam associated with the at least one default bandwidth of the configured BWP.

In some aspects, a method of wireless communication performed by a base station includes transmitting, to a UE, a frequency configuration that indicates at least one default bandwidth associated with a configured BWP; and communicating with the UE using at least one default beam associated with the at least one default bandwidth of the configured BWP.

In some aspects, a UE for wireless communication includes a memory, and one or more processors coupled to the memory, the memory and the one or more processors configured to: receive, from a base station, a frequency configuration that indicates at least one default bandwidth associated with a configured BWP; and communicate with the base station using at least one default beam associated with the at least one default bandwidth of the configured BWP.

In some aspects, a base station for wireless communication includes a memory, and one or more processors coupled to the memory, the memory and the one or more processors configured to: transmit, to a UE, a frequency configuration that indicates at least one default bandwidth associated with a configured BWP; and communicate with the UE using at least one default beam associated with the at least one default bandwidth of the configured BWP.

In some aspects, a non-transitory computer-readable medium storing one or more instructions for wireless communication includes one or more instructions that, when executed by one or more processors of a UE, cause the one or more processors to: receive, from a base station, a frequency configuration that indicates at least one default bandwidth associated with a configured BWP; and communicate with the base station using at least one default beam associated with the at least one default bandwidth of the configured BWP.

In some aspects, a non-transitory computer-readable medium storing one or more instructions for wireless communication includes one or more instructions that, when executed by one or more processors of a base station, cause the one or more processors to: transmit, to a UE, a frequency configuration that indicates at least one default bandwidth associated with a configured BWP; and communicate with the UE using at least one default beam associated with the at least one default bandwidth of the configured BWP.

In some aspects, an apparatus for wireless communication includes means for receiving, from a base station, a frequency configuration that indicates at least one default bandwidth associated with a configured BWP; and means for communicating with the base station using at least one default beam associated with the at least one default bandwidth of the configured BWP.

In some aspects, an apparatus for wireless communication includes means for transmitting, to a UE, a frequency configuration that indicates at least one default bandwidth associated with a configured BWP; and means for communicating with the UE using at least one default beam associated with the at least one default bandwidth of the configured BWP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4 and 5 are diagrams illustrating example processes associated with default beam operation over a bandwidth part as a function of a default bandwidth configured for a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
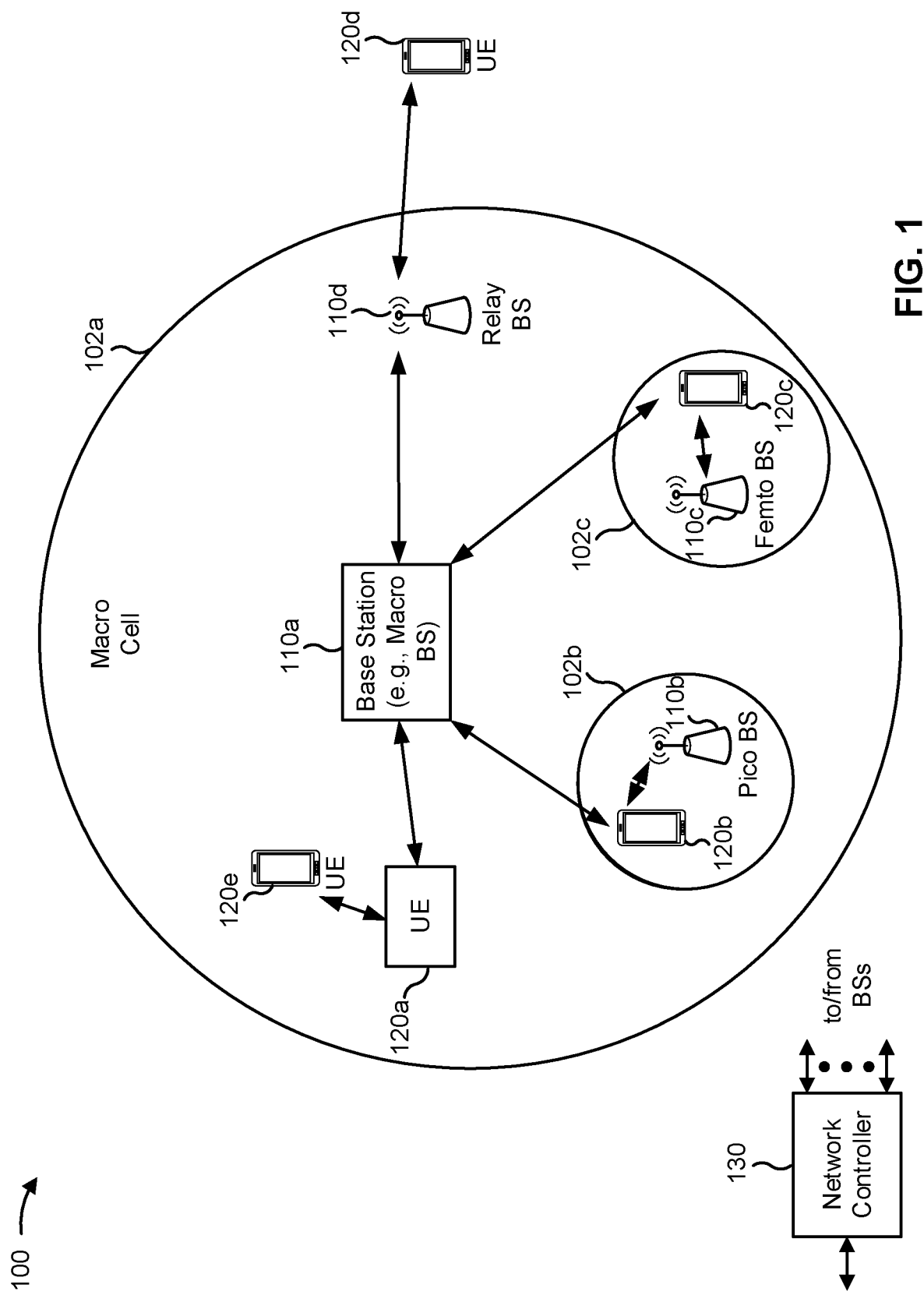
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band.

Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
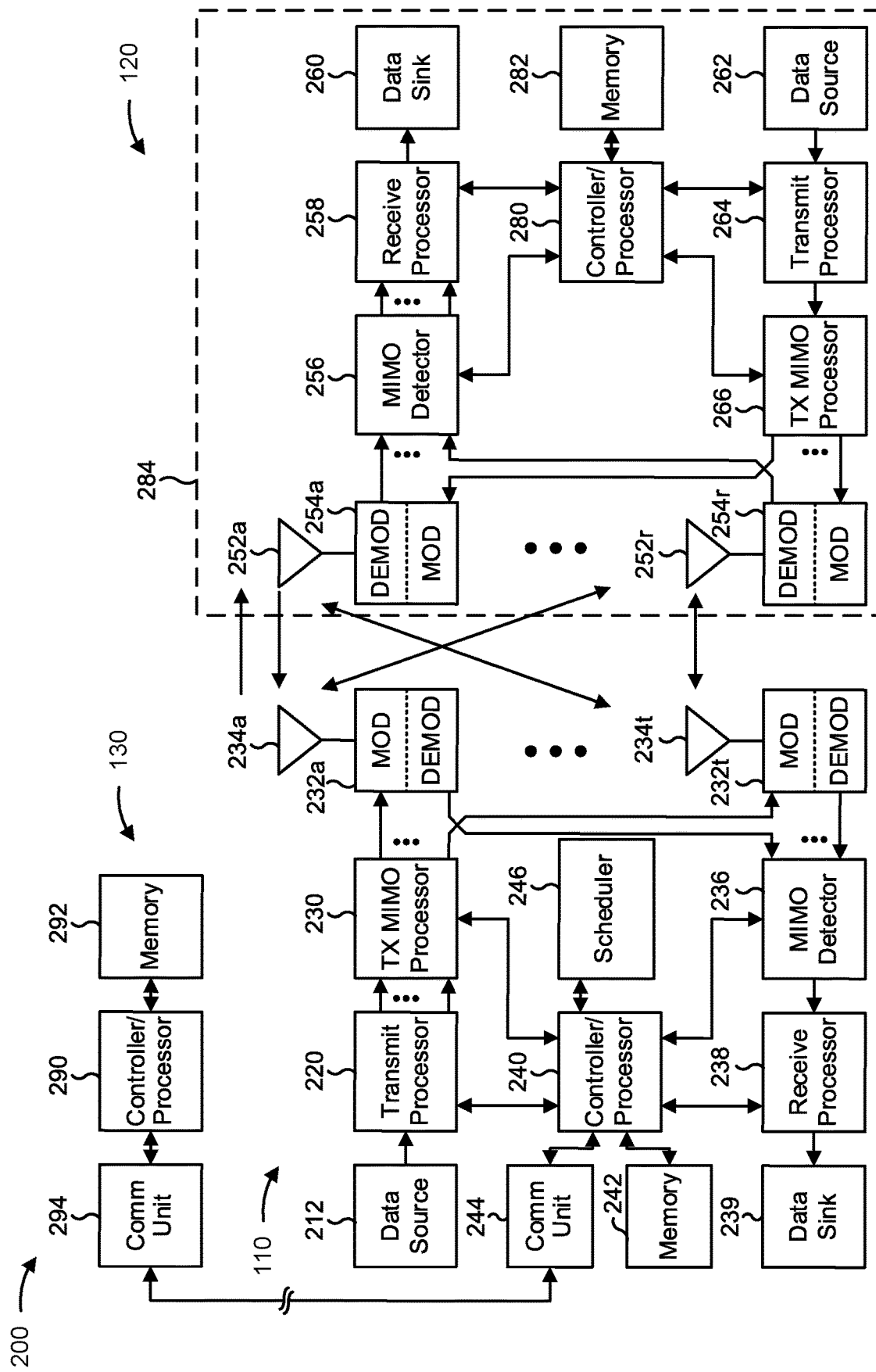
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with default beam operation over a bandwidth part as a function of a default bandwidth configured for a UE, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for receiving, from a base station, a frequency configuration that indicates at least one default bandwidth associated with a configured BWP, means for communicating with the base station using at least one default beam associated with the at least one default bandwidth of the configured BWP, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a frequency configuration that indicates at least one default bandwidth associated with a configured BWP, means for communicating with the UE using at least one default beam associated with the at least one default bandwidth of the configured BWP, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Increases in carrier frequencies may enable the use of larger antenna arrays and bandwidths by UEs. Additionally, interest in millimeter wave frequency regimes is increasing, as these bandwidths can accommodate larger channel bandwidths than non-millimeter wave bandwidths. Bandwidth parts (BWPs), which are subsets of contiguous common physical resource blocks, may be used to configured active frequencies based on a UE's needs and capabilities. Within a component carrier (CC), different BWPs may be supported on a band. In a typical case, a UE is expected to receive and transmit only within the frequency range configured for an active BWP. In some cases, however, a communication does not need to use an entire BWP (e.g., in the case of incremental downloads, and/or the like), while in other cases, a communication may use most or all of the BWP.

In a typical case, a default beam for a physical downlink shared channel (PDSCH) may be based on a latest active transmission configuration indicator state of a lowest control resource set identifier. There is no dependence of a default beam on a configured bandwidth. With large bandwidths (e.g., millimeter wave regime bandwidths) and large arrays (e.g., multiple-in multiple-out (MIMO) arrays), a set of beam weights designed for a certain active frequency of the BWP can suffer significant array gain deterioration over that BWP. The same beam weights also may suffer degradations over different BWPs within the same CC and/or band.

According to various techniques and aspects described herein, default beam operation over a BWP may be a function of a default bandwidth configured for a UE. A default bandwidth within a BWP may correspond to an active frequency range. In some aspects, any number of configured BWPs may have associated default bandwidths. In this way, beam weights may more closely correlate to actual active frequency ranges, which may reduce degradation and improve signal quality and efficiency in frequency resource use. In some aspects, a UE may suggest preferred default bandwidths based on use case conditions, UE capabilities, and/or the like. In this way, default bandwidths may be adaptable to certain use cases, capabilities, and/or the like. As a result, frequency resources may be more efficiently allocated and beam weights may be more effective, thereby improving signal quality, communication reliability, and/or the like.

Figure 3:
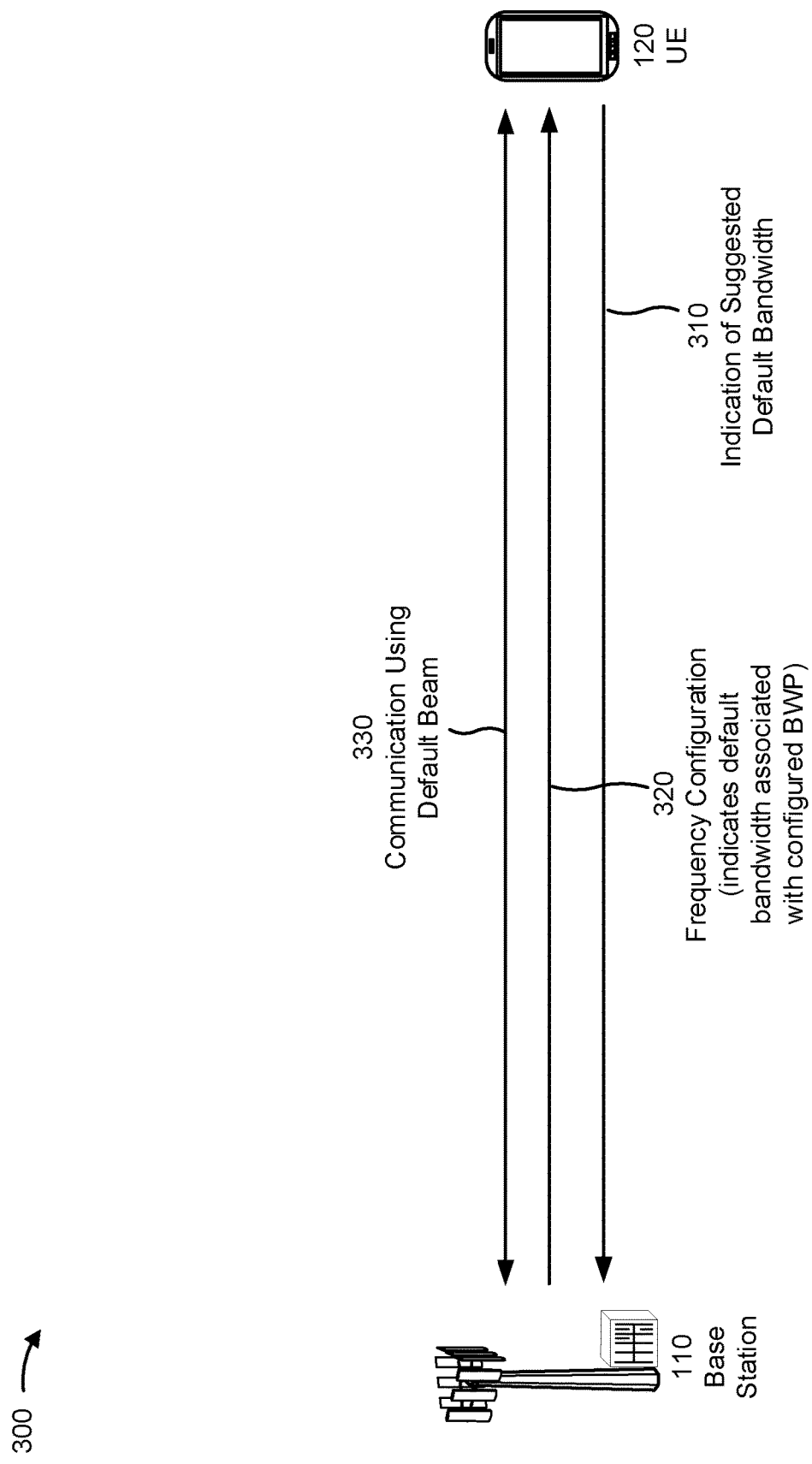
FIG. 3 is a diagram illustrating an example associated with default beam operation over a bandwidth part as a function of a default bandwidth configured for a user equipment (UE), in accordance with the present disclosure.

FIG. 3 is a diagram illustrating an example 300 associated with default beam configuration for millimeter wave regimes with MIMO systems, in accordance with the present disclosure. As shown, a base station 110 and a UE 120 may communicate with one another.

As shown by reference number 310, the UE 120 may transmit, and the base station 110 may receive, an indication of a suggested at least one default bandwidth. In some aspects, the suggested at least one default bandwidth may be based at least in part on a use case condition, a UE capability, and/or the like.

As shown by reference number 320, the base station 110 may transmit, and the UE 120 may receive, a frequency configuration. In some aspects, the frequency configuration may indicate at least one default bandwidth associated with a configured BWP. In some aspects, the at least one default bandwidth may be the suggested at least one default bandwidth. In some aspects, the UE 120 may refrain from performing beam refinement based at least in part on the at least one default bandwidth being the suggested at least one default bandwidth.

As shown by reference number 330, the UE 120 may communicate with the base station 110 using at least one default beam associated with the at least one default bandwidth of the configured BWP. In some aspects, the base station 110 may transmit, and the UE 120 may receive, an active frequency range allocation. The at least one default bandwidth may correspond to the active frequency range allocation.

In some aspects, the base station 110 may transmit, and the UE 120 may receive, a configuration of at least one reference signal (RS) to assist the UE 120 with beam refinement. In some aspects, the configuration of the at least one RS may be based at least in part on a bandwidth of the active frequency range allocation satisfying a threshold. In some aspects, the threshold may be a threshold bandwidth difference. For example, the bandwidth of the active frequency range allocation may satisfy the threshold when a difference between the bandwidth and the default bandwidth is greater than or equal to the threshold. In some aspects, the at least one RS may include at least one channel state information RS (CSI-RS) or at least one sounding RS (SRS).

In some aspects, the base station 110 may transmit, and the UE 120 may receive, a configuration of at least one quasi co-location (QCL) relationship. In some aspects, the at least one QCL relationship may be based at least in part on the at least one RS. In some aspects, the UE 120 may transmit, and the base station 110 may receive, an indication of at least one QCL relationship. In this way, the base station 110 may be able to reconfigure the at least one QCL relationship to create a new QCL relationship. In some aspects, the at least one QCL relationship may be based at least in part on the at least one RS.

According to some aspects described above, default beam operation over a BWP may be a function of a default bandwidth configured for a UE. A default bandwidth within a BWP may correspond to an active frequency range. In this way, beam weights may more closely correlate to actual active frequency ranges, which may reduce degradation and improve signal quality and efficiency in frequency resource use. In some aspects, a UE may suggest preferred default bandwidths based on use case conditions, UE capabilities, and/or the like. In this way, default bandwidths may be adaptable to certain use cases, capabilities, and/or the like. As a result, frequency resources may be more efficiently allocated, and beam weights may be more effective, thereby improving signal quality, communication reliability, and/or the like.

As indicated above, FIG. 3 is provided as an example. Other examples may differ from what is described with regard to FIG. 3.

Figure 4:
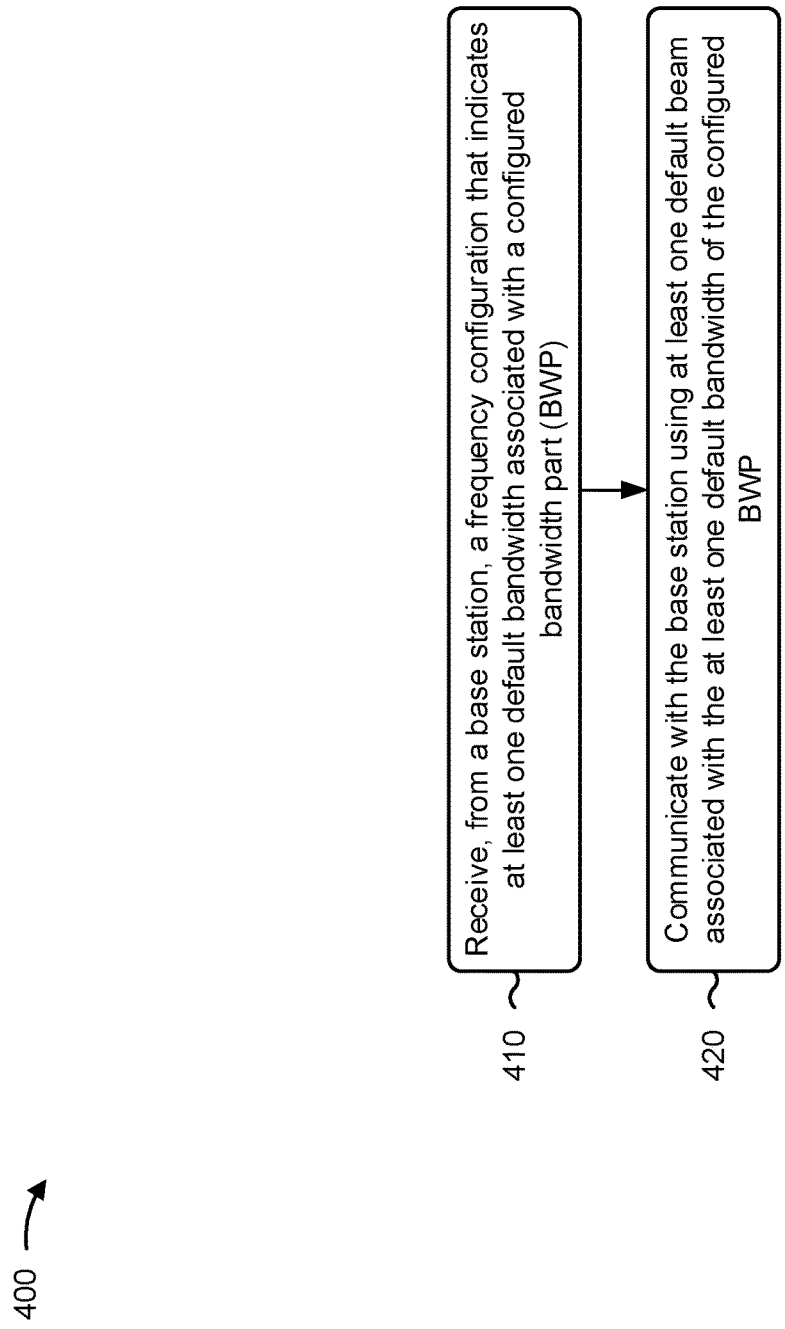

FIG. 4 is a diagram illustrating an example process 400 performed, for example, by a UE, in accordance with the present disclosure. Example process 400 is an example where the UE (e.g., UE 120 and/or the like) performs operations associated with default beam configuration for millimeter wave regimes with MIMO systems.

As shown in FIG. 4, in some aspects, process 400 may include receiving, from a base station, a frequency configuration that indicates at least one default bandwidth associated with a configured BWP (block 410). For example, the UE (e.g., using receive processor 258, controller/processor 280, memory 282, and/or the like) may receive, from a base station, a frequency configuration that indicates at least one default bandwidth associated with a configured BWP, as described above.

As further shown in FIG. 4, in some aspects, process 400 may include communicating with the base station using at least one default beam associated with the at least one default bandwidth of the configured BWP (block 420). For example, the UE (e.g., using receive processor 258, transmit processor 264, controller/processor 280, memory 282, and/or the like) may communicate with the base station using at least one default beam associated with the at least one default bandwidth of the configured BWP, as described above.

Process 400 may include additional aspects, such as any single aspect or any combination of aspects described below and/or in connection with one or more other processes described elsewhere herein.

In a first aspect, the at least one default bandwidth corresponds to at least one active frequency range allocated by the base station.

In a second aspect, alone or in combination with the first aspect, process 400 includes transmitting, to the base station, an indication that indicates a suggested at least one default bandwidth.

In a third aspect, alone or in combination with the second aspect, the at least one default bandwidth is the suggested at least one default bandwidth.

In a fourth aspect, alone or in combination with the third aspect, the UE refrains from performing beam refinement based at least in part on the at least one default bandwidth being the suggested at least one default bandwidth.

In a fifth aspect, alone or in combination with one or more of the first through fourth aspects, process 400 includes receiving an active frequency range allocation and receiving a configuration of at least one RS to assist the UE with beam refinement, where the configuration of the at least one RS is based at least in part on a bandwidth of the active frequency range allocation satisfying a threshold.

In a sixth aspect, alone or in combination with the fifth aspect, the at least one RS comprises at least one CSI-RS or at least one SRS.

In a seventh aspect, alone or in combination with one or more of the fifth through sixth aspects, process 400 includes receiving a configuration of at least one QCL relationship, where the at least one QCL relationship is based at least in part on the at least one RS.

In an eighth aspect, alone or in combination with one or more of the fifth through seventh aspects, process 400 includes transmitting an indication of at least one QCL relationship, where the at least one QCL relationship is based at least in part on the at least one RS.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a base station, in accordance with the present disclosure. Example process 500 is an example where the base station (e.g., base station 110 and/or the like) performs operations associated with default beam configuration for millimeter wave regimes with MIMO systems.

As shown in FIG. 5, in some aspects, process 500 may include transmitting, to a UE, a frequency configuration that indicates at least one default bandwidth associated with a configured BWP (block 510). For example, the base station (e.g., using transmit processor 220, controller/processor 240, memory 242, and/or the like) may transmit, to a UE, a frequency configuration that indicates at least one default bandwidth associated with a configured BWP, as described above.

As further shown in FIG. 5, in some aspects, process 500 may include communicating with the UE using at least one default beam associated with the at least one default bandwidth of the configured BWP (block 520). For example, the base station (e.g., using transmit processor 220, receive processor 238, controller/processor 240, memory 242, and/or the like) may communicate with the UE using at least one default beam associated with the at least one default bandwidth of the configured BWP, as described above.

Process 500 may include additional aspects, such as any single aspect or any combination of aspects described below and/or in connection with one or more other processes described elsewhere herein.

In a first aspect, the at least one default bandwidth corresponds to at least one active frequency range allocated by the base station.

In a second aspect, alone or in combination with the first aspect, process 500 includes receiving, from the UE, an indication that indicates a suggested at least one default bandwidth.

In a third aspect, alone or in combination with the second aspect, the at least one default bandwidth is the suggested at least one default bandwidth.

In a fourth aspect, alone or in combination with one or more of the first through third aspects, process 500 includes transmitting an active frequency range allocation and transmitting a configuration of at least one RS to assist the UE with beam refinement, where the configuration of the at least one RS is based at least in part on a bandwidth of the active frequency range allocation satisfying a threshold.

In a fifth aspect, alone or in combination with the fourth aspect, the at least one RS comprises at least one CSI-RS or at least one SRS.

In a sixth aspect, alone or in combination with the fifth aspect, process 500 includes transmitting a configuration of at least one QCL relationship, where the at least one QCL relationship is based at least in part on the at least one RS.

In a seventh aspect, alone or in combination with one or more of the fifth through sixth aspects, process 500 includes receiving an indication of at least one QCL relationship, where the at least one QCL relationship is based at least in part on the at least one RS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: receiving, from a base station, a frequency configuration that indicates at least one default bandwidth associated with a configured bandwidth part (BWP); and communicating with the base station using at least one default beam associated with the at least one default bandwidth of the configured BWP.

Aspect 2: The method of Aspect 1, wherein the at least one default bandwidth corresponds to at least one active frequency range allocated by the base station.

Aspect 3: The method of either of Aspects 1 or 2, further comprising transmitting, to the base station, an indication that indicates a suggested at least one default bandwidth.

Aspect 4: The method of Aspect 3, wherein the at least one default bandwidth is the suggested at least one default bandwidth.

Aspect 5: The method of Aspect 4, wherein the UE refrains from performing beam refinement based at least in part on the at least one default bandwidth being the suggested at least one default bandwidth.

Aspect 6: The method of any of Aspects 1-5, further comprising: receiving an active frequency range allocation; and receiving a configuration of at least one reference signal (RS) to assist the UE with beam refinement, wherein the configuration of the at least one RS is based at least in part on a bandwidth of the active frequency range allocation satisfying a threshold.

Aspect 7: The method of Aspect 6, wherein the at least one RS comprises at least one channel state information RS or at least one sounding RS.

Aspect 8: The method of either of Aspects 6 or 7, further comprising receiving a configuration of at least one quasi co-location (QCL) relationship, wherein the at least one QCL relationship is based at least in part on the at least one RS.

Aspect 9: The method of any of Aspects 6-8, further comprising transmitting an indication of at least one quasi co-location (QCL) relationship, wherein the at least one QCL relationship is based at least in part on the at least one RS.

Aspect 10: A method of wireless communication performed by a base station, comprising: transmitting, to a user equipment (UE), a frequency configuration that indicates at least one default bandwidth associated with a configured bandwidth part (BWP); and communicating with the UE using at least one default beam associated with the at least one default bandwidth of the configured BWP.

Aspect 11: The method of Aspect 10, wherein the at least one default bandwidth corresponds to at least one active frequency range allocated by the base station.

Aspect 12: The method of either of Aspects 10 or 11, further comprising receiving, from the UE, an indication that indicates a suggested at least one default bandwidth.

Aspect 13: The method of Aspect 12, wherein the at least one default bandwidth is the suggested at least one default bandwidth.

Aspect 14: The method of any of Aspects 10-13, further comprising: transmitting an active frequency range allocation; and transmitting a configuration of at least one reference signal (RS) to assist the UE with beam refinement, wherein the configuration of the at least one RS is based at least in part on a bandwidth of the active frequency range allocation satisfying a threshold.

Aspect 15: The method of Aspect 14, wherein the at least one RS comprises at least one channel state information RS or at least one sounding RS.

Aspect 16: The method of Aspect 15, further comprising transmitting a configuration of at least one quasi co-location (QCL) relationship, wherein the at least one QCL relationship is based at least in part on the at least one RS.

Aspect 17: The method of either of Aspects 15 or 16, further comprising receiving an indication of at least one quasi co-location (QCL) relationship, wherein the at least one QCL relationship is based at least in part on the at least one RS.

Aspect 18: An apparatus for wireless communication at a device, comprising a processor; memory coupled with the processor; and instructions stored in the memory and executable by the processor to cause the apparatus to perform the method of one or more Aspects of Aspects 1-9.

Aspect 19: A device for wireless communication, comprising a memory and one or more processors coupled to the memory, the memory and the one or more processors configured to perform the method of one or more Aspects of Aspects 1-9.

Aspect 20: An apparatus for wireless communication, comprising at least one means for performing the method of one or more Aspects of Aspects 1-9.

Aspect 21: A non-transitory computer-readable medium storing code for wireless communication, the code comprising instructions executable by a processor to perform the method of one or more Aspects of Aspects 1-9.

Aspect 22: A non-transitory computer-readable medium storing a set of instructions for wireless communication, the set of instructions comprising one or more instructions that, when executed by one or more processors of a device, cause the device to perform the method of one or more Aspects of Aspects 1-9.

Aspect 23: An apparatus for wireless communication at a device, comprising a processor; memory coupled with the processor; and instructions stored in the memory and executable by the processor to cause the apparatus to perform the method of one or more Aspects of Aspects 10-17.

Aspect 24: A device for wireless communication, comprising a memory and one or more processors coupled to the memory, the memory and the one or more processors configured to perform the method of one or more Aspects of Aspects 10-17.

Aspect 25: An apparatus for wireless communication, comprising at least one means for performing the method of one or more Aspects of Aspects 10-17.

Aspect 26: A non-transitory computer-readable medium storing code for wireless communication, the code comprising instructions executable by a processor to perform the method of one or more Aspects of Aspects 10-17.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 10-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive, from a network entity, a frequency configuration that indicates at least one default bandwidth associated with a configured bandwidth part (BWP);
receive or transmit a configuration of at least one quasi co-location (QCL) relationship that is based at least in part on at least one reference signal (RS) configured to assist the UE with beam refinement, the at least one RS being configured based at least in part on the default bandwidth; and
communicate with the network entity using at least one default beam associated with the at least one default bandwidth.

2. The UE of claim 1, wherein the at least one default bandwidth corresponds to at least one active frequency range allocated by the network entity.

3. The UE of claim 2, wherein the one or more processors are further configured to transmit, to the network entity, an indication that indicates a suggested at least one default bandwidth.

4. The UE of claim 3, wherein the at least one default bandwidth is the suggested at least one default bandwidth.

5. The UE of claim 4, wherein the UE refrains from performing beam refinement based at least in part on the at least one default bandwidth being the suggested at least one default bandwidth.

6. The UE of claim 1, wherein the one or more processors are further configured to:
receive an active frequency range allocation; and
receive a configuration of the at least one RS, wherein the configuration of the at least one RS is based at least in part on a bandwidth of the active frequency range allocation.

7. The UE of claim 1, wherein the at least one RS comprises at least one channel state information RS or at least one sounding RS.

8. A network entity for wireless communication, comprising:
a memory; and
one or more processors, coupled to the memory, configured to:
transmit, for a user equipment (UE), a frequency configuration that indicates at least one default bandwidth associated with a configured bandwidth part (BWP);
transmit or receive a configuration of at least one quasi co-location (QCL) relationship that is based at least in part on at least one reference signal (RS) configured to assist the UE with beam refinement, the at least one RS being configured based at least in part on the default bandwidth; and
communicate with the UE using at least one default beam associated with the at least one default bandwidth.

9. The network entity of claim 8, wherein the at least one default bandwidth corresponds to at least one active frequency range allocated by the network entity.

10. The network entity of claim 8, wherein the one or more processors are further configured to receive an indication that indicates a suggested at least one default bandwidth.

11. The network entity of claim 10, wherein the at least one default bandwidth is the suggested at least one default bandwidth.

12. The network entity of claim 8, wherein the one or more processors are further configured to:
transmit an active frequency range allocation; and
transmit a configuration of the at least one RS, wherein the configuration of the at least one RS is based at least in part on a bandwidth of the active frequency range allocation.

13. The network entity of claim 8, wherein the at least one RS comprises at least one channel state information RS or at least one sounding RS.

14. A method of wireless communication performed by a user equipment (UE), comprising:
receiving, from a network entity, a frequency configuration that indicates at least one default bandwidth associated with a configured bandwidth part (BWP);
receiving or transmitting a configuration of at least one quasi co-location (QCL) relationship that is based at least in part on at least one reference signal (RS) configured to assist the UE with beam refinement, the at least one RS being configured based at least in part on the default bandwidth; and
communicating with the network entity using at least one default beam associated with the at least one default bandwidth.

15. The method of claim 14, wherein the at least one default bandwidth corresponds to at least one active frequency range allocated by the network entity.

16. The method of claim 14, further comprising transmitting, to the network entity, an indication that indicates a suggested at least one default bandwidth.

17. The method of claim 16, wherein the at least one default bandwidth is the suggested at least one default bandwidth.

18. The method of claim 17, wherein the UE refrains from performing beam refinement based at least in part on the at least one default bandwidth being the suggested at least one default bandwidth.

19. The method of claim 14, further comprising:
receiving an active frequency range allocation; and
receiving a configuration of the at least one RS, wherein the configuration of the at least one RS is based at least in part on a bandwidth of the active frequency range allocation.

20. The method of claim 14, wherein the at least one RS comprises at least one channel state information RS or at least one sounding RS.

21. A method of wireless communication performed by a network entity, comprising:
transmitting, for a user equipment (UE), a frequency configuration that indicates at least one default bandwidth associated with a configured bandwidth part (BWP);
transmitting or receiving a configuration of at least one quasi co-location (QCL) relationship that is based at least in part on at least one reference signal (RS) configured to assist the UE with beam refinement, the at least one RS being configured based at least in part on the default bandwidth; and
communicating with the UE using at least one default beam associated with the at least one default bandwidth.

22. The method of claim 21, wherein the at least one default bandwidth corresponds to at least one active frequency range allocated by the network entity.

23. The method of claim 21, further comprising receiving an indication that indicates a suggested at least one default bandwidth.

24. The method of claim 23, wherein the at least one default bandwidth is the suggested at least one default bandwidth.

25. The method of claim 23, further comprising:
transmitting an active frequency range allocation; and
transmitting a configuration of the at least one RS, wherein the configuration of the at least one RS is based at least in part on a bandwidth of the active frequency range allocation.

26. The method of claim 23, wherein the at least one RS comprises at least one channel state information RS or at least one sounding RS.

* * * * *